United States Patent [19]

Nicodemus

[11] Patent Number: 5,586,442
[45] Date of Patent: Dec. 24, 1996

[54] THERMAL ABSORPTION COMPRESSION CYCLE

[75] Inventor: Carl D. Nicodemus, Satellite Beach, Fla.

[73] Assignee: Helios Research Corp., Mumford, N.Y.

[21] Appl. No.: 324,779

[22] Filed: Oct. 17, 1994

[51] Int. Cl.⁶ ................................................. F25B 15/00
[52] U.S. Cl. ............................ 62/107; 62/484; 62/494; 417/54; 417/173
[58] Field of Search .......................... 62/101, 107, 476, 62/484, 494, 487; 417/54, 55, 173, 174

[56] References Cited

U.S. PATENT DOCUMENTS

| | | | |
|---|---|---|---|
| 4,545,739 | 10/1985 | Nicodemus | 417/152 |
| 4,569,635 | 2/1986 | Nicodemus | 417/196 |
| 4,580,948 | 4/1986 | Schmidlin | 417/54 |
| 4,673,335 | 6/1987 | Nicodemus | 417/54 |
| 4,725,201 | 2/1988 | Nicodemus | 417/54 |
| 4,781,537 | 11/1988 | Nicodemus et al. | 417/54 |

*Primary Examiner*—William Doerrler
*Attorney, Agent, or Firm*—Eugene Stephens & Associates

[57] ABSTRACT

An absorption cycle system uses a hydrokinetic amplifier as an absorber, and the hydrokinetic amplifier merges a working vapor stream with a working liquid stream to condense the vapor and absorb it in a working mixture that is output at a higher temperature and pressure than either input. Since the hydrokinetic amplifier absorber does not discard heat, the retained heat is used to help power the system and reduce heat waste that would otherwise occur.

48 Claims, 5 Drawing Sheets

THERMAL ABSORPTION COMPRESSION CYCLE

FIELD OF THE INVENTION

This invention involves absorption cycle systems, improved absorbers for such systems, and improved energy conservation contributing to efficiency of such systems.

BACKGROUND

Absorption cycle systems discard heat at an absorber that combines a working fluid vapor, such as ammonia, with a working liquid, such as water, so that the vapor condenses and is absorbed in the liquid. The absorbed ammonia and water mixture is then pumped to a higher pressure regenerator that separates the fluids, recycles the working liquid, and delivers the working vapor to a condenser and other components that typically use the working fluid as a refrigerant.

Hydrokinetic amplifiers, such as described in U.S. Pat. Nos. 4,781,537; 4,725,201; 4,673,335; 4,580,948; 4,569,635; and 4,545,739 are known to be capable of merging water and ammonia vapor streams, but little has been done to explore the practicalities of this. The present invention involves such exploration and leads to significant improvements in absorption cycle systems.

SUMMARY OF THE INVENTION

I have now discovered that using a hydrokinetic amplifier in place of an absorber in an absorption cycle system produces significant improvements in system operation and efficiency. A hydrokinetic amplifier can not only accomplish the absorption that is needed in an absorption cycle system, but also adds compression, with its attendant benefits. The presence of a hydrokinetic amplifier in an absorption cycle system enables retention of heat that would otherwise be discarded and also facilitates intra-system heat transfers that significantly improve efficiency.

One advantage that a hydrokinetic amplifier contributes when arranged according to the invention as an absorber in an absorption cycle system is that more of the working fluid can be entrained with working liquid than is possible to absorb in the liquid. A hydrokinetic amplifier's ability to produce an increased pressure outflow enables this by allowing additional working vapor, beyond what can be absorbed in the working liquid, to be entrained and pumped along with the absorbed mixture in the pressurized output. This improves efficiency by enabling the system liquid to accommodate a larger flow rate of working vapor. It also eliminates the need for a separate pump to pressurize the absorber output. In effect, the compressive ability of the hydrokinetic amplifier works along with the absorption effect produced by the merger of the liquid and vapor streams to liquify more working vapor.

A hydrokinetic amplifier arranged according to the invention to act as an absorber in an absorption cycle system systematically retains the heat of the arriving fluids and delivers the systematically retained heat to downstream components. This eliminates discarding of heat at the absorber and correspondingly reduces the heat that is needed to power the system. Some heat still needs to be discarded from the system liquid and from the condenser for the working fluid, and heat still needs to be added at the regenerator; but the inventive presence of the hydrokinetic amplifier reduces the heat losses and significantly improves efficiency.

The ability of a hydrokinetic amplifier absorber to retain the heat of the arriving fluids allows heat transfer from downstream of the hydrokinetic amplifier to superheat the working vapor entering the hydrokinetic amplifier. It would not make sense to pre-heat the vapor entering a conventional absorber, which operates exothermically and must discard heat.; but a hydrokinetic amplifier can improve its performance by operating with warmer input vapor. The output temperature from a hydrokinetic amplifier in an absorption cycle system is higher than the input temperatures so that a heat transfer for superheating the incoming vapor further increases the output temperature. This increases system temperatures downstream of the hydrokinetic amplifier and can reduce the heat that needs to be added at a regenerator.

An even larger conservation of energy can be applied to the heat acquired by the working fluid in a chiller of a refrigerant system. The chiller heat can be systematically retained and delivered by the hydrokinetic amplifier back to the regenerator, for a further reduction of the heat that must be added at the regenerator. In effect, the heat absorbed by the working fluid in the chiller, instead of being discarded at an absorber, is used to help power a significantly more efficient system.

DRAWINGS

DETAILED DESCRIPTION

Figure 1:
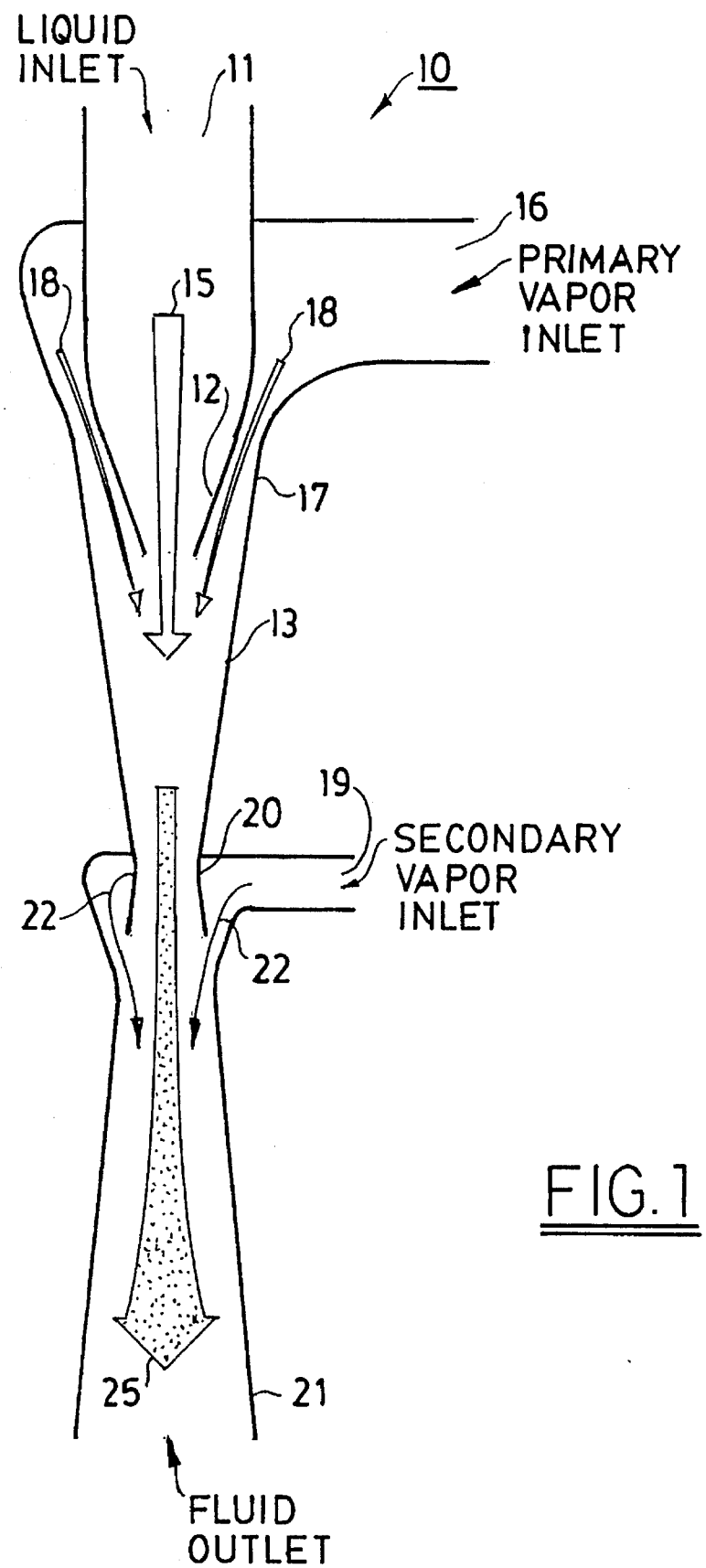
FIG. 1 is a schematic view of a hydrokinetic amplifier arranged to operate as an absorber in an absorption cycle system.

The flows of a working liquid, shown in outlined arrows, and a working vapor, shown in solid arrows, appear schematically in FIG. 1, which shows a hydrokinetic amplifier 10 suitable for serving as an absorber in an absorption cycle system. A stream of working liquid 15 enters liquid inlet 11 and flows through a liquid nozzle 12, which accelerates the liquid stream to a high velocity jet that proceeds through a mixing chamber 13. Liquid stream arrow 15 is made wider at higher pressure regions and narrower at lower pressure regions to illustrate this effect.

A stream of working fluid vapor 18 enters vapor inlet 16, which guides the vapor through a nozzle 17 that preferably surrounds liquid nozzle 12. Vapor nozzle 17 diverges to accelerate the working fluid vapor stream, shown by a pair of solid arrows 18, to merge with the liquid stream 15. The high velocity vapor jet impinges on the liquid jet and transfers the kinetic energy of the vapor to the liquid to accelerate the liquid through mixing chamber 13. This preferably converges in a downstream direction toward a minimum cross-sectional area 20, which is called the R area in the technology describing hydrokinetic amplifiers.

A secondary vapor inlet 19 can receive a secondary or supplemental stream of working fluid vapor to merge with the liquid and vapor mixture in the vicinity of R area 20. The mixture of working liquid and vapor is schematically shown by the spotted arrow 25, which passes through R area 20 and through a diverging diffuser 21; and the secondary vapor stream is schematically shown by a pair of solid arrows 22.

The primary working vapor stream 18 through inlet 16 accelerates and mixes with the working liquid stream 15 so that the vapor and liquid merge and a portion of the vapor condenses and is absorbed in the working liquid. Additional vapor, in excess of the absorbable portion of the vapor, entrains in the turbulent liquid stream passing through mixing chamber 13 and proceeds with the liquid through diffuser 21. A high velocity and low pressure region of the rapidly flowing mixture substantially fills R area 20, which effectively isolates downstream conditions from upstream conditions. The rapid flow through R area 20 blocks any return flow, even though the downstream pressure is higher than either the liquid or vapor input pressures. The high velocity and low pressure in the vicinity of R area 20 also allow additional working vapor 22 to pass through inlet 19 and merge with the fluid mixture represented by arrow 25. As the mixture proceeds through diffuser 21, the fluid velocity gradually diminishes and the pressure gradually increases as velocity is converted to pressure. The increased pressure compresses and condenses more of the entrained vapor, which raises the mixture temperature by the heat of condensation.

Since hydrokinetic amplifier 10 systematically retains the heat of the incoming liquid and vapor streams, without discarding heat, and since compression and absorption condenses the working fluid vapor in the working liquid, yielding the heat of condensation, the temperature of the output from diffuser 21 is higher than the temperature of either the liquid or vapor input streams. This conserves the energy of the fluid inputs to hydrokinetic amplifier 10, which results in elevated temperature and pressure of an output delivered to downstream system components. This alone makes an absorption cycle system using a hydrokinetic amplifier far more efficient than a similar system using a conventional absorber, which must discard heat from the merger of the liquid and vapor streams.

Besides the systematic retention of energy, hydrokinetic amplifier 10 has additional advantages over other absorbers in being compact and being able to merge vapor with liquid at a significant rate of mass transfer. Also, the increased pressure output from hydrokinetic amplifier 10 eliminates the need for a pump, since the pressure output can easily range upwards of 300 psig.

Figure 2:
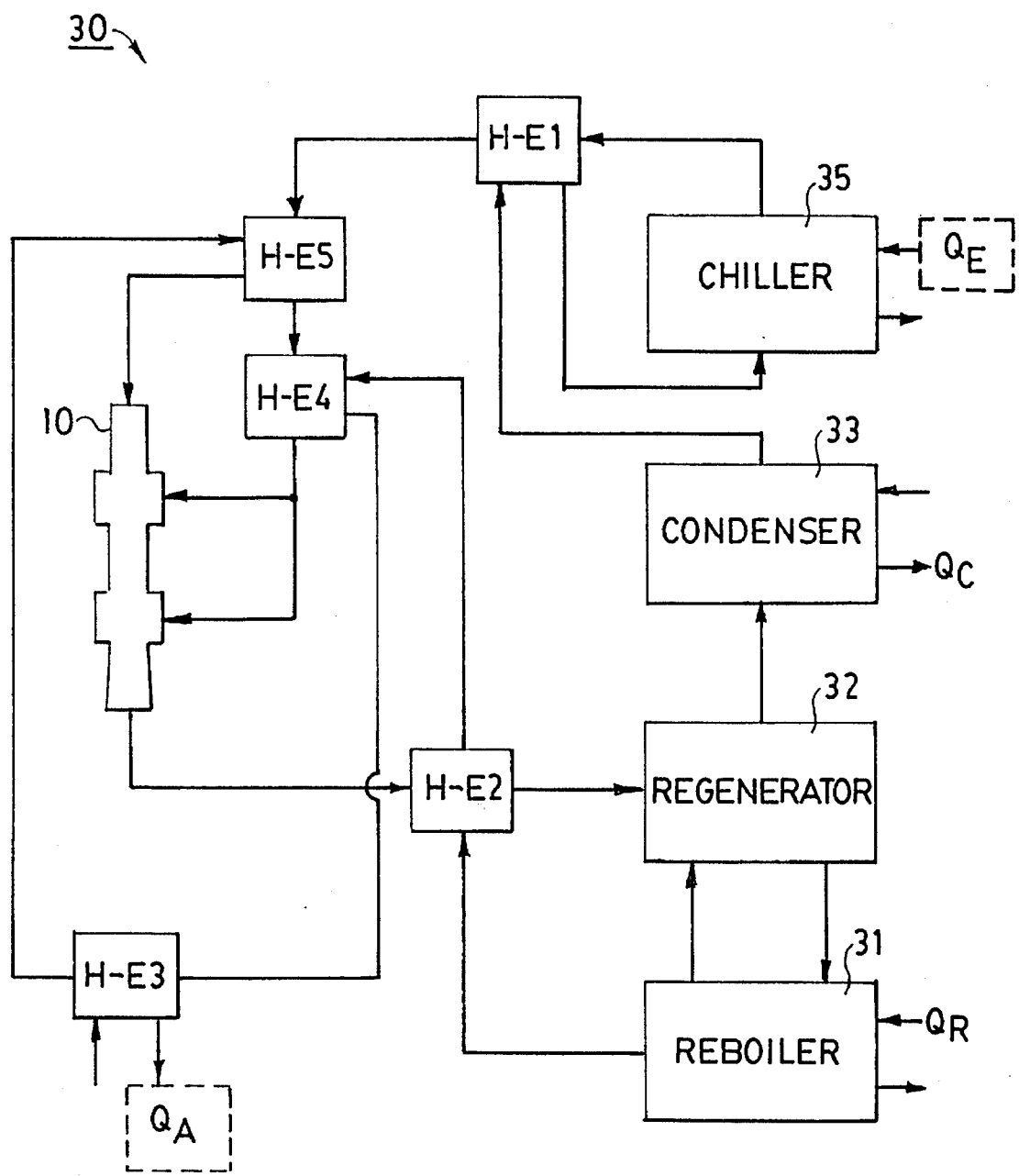
FIG. 2 is a schematic diagram of an absorption cycle system using a hydrokinetic amplifier as an absorber and arranged to take advantage of the heat retention and heat exchange capabilities that the hydrokinetic amplifier provides.

An example of how the operating characteristics of hydrokinetic amplifier 10 can be exploited in an absorption cycle system. is shown by the system 30 that is schematically illustrated in FIG. 2. Conventional absorption circuit components, some of which are omitted for simplicity, are arranged along the right side of FIG. 2; and hydrokinetic amplifier 10 and a number of heat exchangers cooperating with hydrokinetic amplifier 10 are arranged to the left of the right-hand side of FIG. 2.

Conventional components of system 30 include reboiler 31 cooperating with regenerator 32 and adding heat $Q_R$ for separating the working materials, which are often ammonia and water, but can be other substances. Condenser 33 then condenses the working vapor and discards heat $Q_C$. Chiller 35, which is the reason for operating absorption cycle system 30 in a refrigerant mode, removes heat $Q_E$ from a system to be cooled by evaporating the working vapor. The vapor that is warmed in chiller 35 passes to hydrokinetic amplifier 10 via heat exchangers that can be arranged in various ways. Upon arrival in hydrokinetic amplifier 10, the working vapor merges with and accelerates the working liquid in the absorption process described above. The elevated temperature and pressure output of hydrokinetic amplifier 10 is directed back to regenerator 32, for re-separating the working fluid streams.

As described so far, absorption cycle system 30 gains efficiency from the ability of hydrokinetic amplifier 10 to conserve the energy of the working fluids without discarding heat as is done in conventional absorbers. In effect, the energy absorbed by the working vapor in chiller 35 is conserved, instead of discarded, and is used to help power system 30, which thereby reduces the energy $Q_R$ that must be added at reboiler 31.

The arrangement of heat exchangers H-E1 through H-E5 further improves the efficiencies attainable from the operation of hydrokinetic amplifier 10 as an absorber in cycle 30. Heat exchanger 1 chills the condensed working vapor proceeding from condenser 33 to chiller 35 to increase the capacity of the condensate to absorb heat from a system to be cooled. At the same time, heat exchanger 1 further warms the working vapor output of chiller 35, which will benefit the operation of hydrokinetic amplifier 10.

At heat exchanger 2, the fluid mixture output from hydrokinetic amplifier 10 acquires some of the heat of the working liquid output of regenerator 32 and reboiler 31. This helps cool the working liquid stream headed back to hydrokinetic amplifier 10 and also warms the working fluid mixture headed for regenerator 32, which reduces the heat $Q_R$ that must be added at reboiler 31.

The working liquid stream from heat exchanger 2 passes through heat exchangers 4, 3, and 5 en route to hydrokinetic amplifier 10. At heat exchanger 4, the working liquid gives up some heat to the vapor stream headed toward hydrokinetic amplifier 10, which in turn heats the vapor to improve its performance. Heat exchanger 3 discards heat $Q_A$ to the extent necessary to keep the liquid stream cool enough for condensing vapor in the mixing chamber of hydrokinetic amplifier 10. Heat exchanger 5 removes more heat from the liquid stream and in turn pre-heats the vapor input to hydrokinetic amplifier 10. These heat exchangers can be used in different sequences and can be employed in different numbers. The principle involved is transferring as much heat as possible from the working liquid to preheat the working vapor, so as to minimize the amount of energy that is discarded as $Q_A$.

Heat exchanger 4 serves as a superheater for the vapor input to hydrokinetic amplifier 10. Heating the incoming vapor to a temperature above saturation allows the vapor to merge with and condense in a warmer stream of working liquid in the mixing chamber of hydrokinetic amplifier 10. This also raises the temperature of the output fluid mixture from hydrokinetic amplifier 10, which in turn raises fluid temperatures in components downstream of hydrokinetic amplifier 10. The effect is cumulative so that a higher temperature output from hydrokinetic amplifier 10 enables a higher temperature exchange at heat exchanger 2 and elevated temperature at heat exchanger 4, which in turn causes an increase in the temperature of the fluid mixture output from hydrokinetic amplifier 10. These temperature increases also appear at regenerator 32 and reboiler 31 where they reduce the amount of heat $Q_R$ that must be added to power the system.

The superheating that occurs at heat exchanger 4 also reduces the amount of heat $Q_A$ that must be thrown away at heat exchanger 3. Superheating the vapor input to hydrokinetic amplifier 10 thus accomplishes several energy conservation feats. It makes hydrokinetic amplifier 10 work better by producing a higher temperature and higher pressure output that requires less added heat at regenerator 32; it allows operation with warmer working liquid so that less heat is discarded at heat exchanger 3; and by raising the temperature of the output from hydrokinetic amplifier 10, it allows a higher temperature of superheating to occur.

The heat $Q_E$ absorbed at chiller 35 is also conserved and used to power system 30, because such heat is not discarded at hydrokinetic amplifier 10. Systematic retention of chiller heat $Q_E$ thus reduces the heat $Q_R$ that must be added at reboiler 31. The improved efficiency that comes from exploiting heat absorbed at chiller 35 enables system 30 to be used as a heat pump. The heat $Q_A$, rejected at heat exchanger 3, and $Q_C$, rejected at condenser 33, can be combined with the heat $Q_E$, acquired at chiller 35, so that the heat output from the combination of $Q_A$ plus $Q_C$ plus $Q_E$ can substantially exceed the heat input at $Q_R$. In effect, chiller 35 extracts energy from an ambient environment, and system 30 conserves and exploits the extracted energy to improve the efficiency of a heat pump.

The efficiency increases caused by hydrokinetic amplifier 10 allow absorption cycles to work as chillers in other situations that were not previously practical. For example, the heat $Q_E$ that is absorbed at chiller 35 can be drawn from the condenser of a Rankine cycle engine. This can increase the efficiency of the Rankine cycle engine by reducing the condenser temperature at which waste heat is discarded. Another possibility that is made practical by the presence of hydrokinetic amplifier 10 operating as an absorber in an absorption cycle system is chilling combustion exhaust gases, either from exhaust gas stacks or from internal combustion engines. Exhaust gas chilling can condense and remove substances that should not be dumped into the atmosphere. Many other possible applications for absorption cycle refrigerant systems may become feasible, as hydrokinetic: amplifier absorbers are made available.

Figure 3:
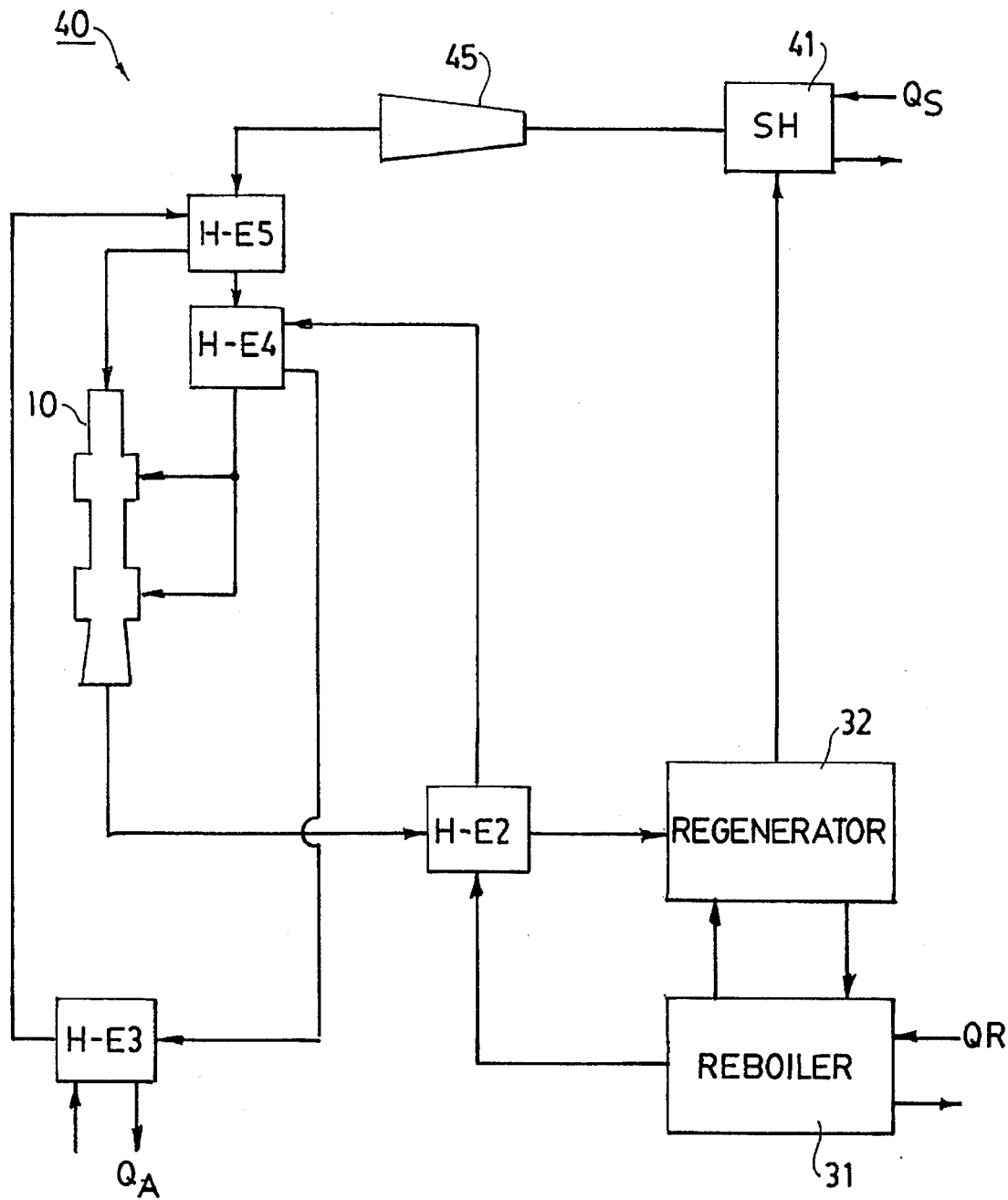
FIG. 3 is a schematic diagram of a simplified absorption cycle system powering a Rankine cycle engine.

The efficiencies produced by using hydrokinetic amplifier 10 as an absorber and compressor in an absorption cycle system also enable the working vapor to be used practically for driving a Rankine cycle engine. An example of this is shown in circuit 40 of FIG. 3 where the working vapor drives turbine 45. In system 40, regenerator 32, reboiler 31, and heat exchangers 2–5 all have the same relationship to hydrokinetic amplifier 10 as previously described for system 30 of FIG. 2. Instead of condensing and then evaporating the working vapor for refrigerant purposes, though, the working vapor from regenerator 32 is delivered to superheater 41 that superheats the vapor before entering turbine 45. The working vapor is preferably near its critical temperature when delivered to superheater 41; because near that temperature, the working vapor can acquire considerable energy with moderate increases in temperature. This energy can then be converted to shaft work in turbine 45 or some other Rankine cycle engine.

The working vapor leaving turbine 45 passes to hydrokinetic amplifier 10 via heat exchangers 4 and 5 as previously described. Hydrokinetic amplifier 10 then functions as a condenser in a Rankine cycle by condensing and absorbing the vapor in the working liquid stream.

Figure 4:
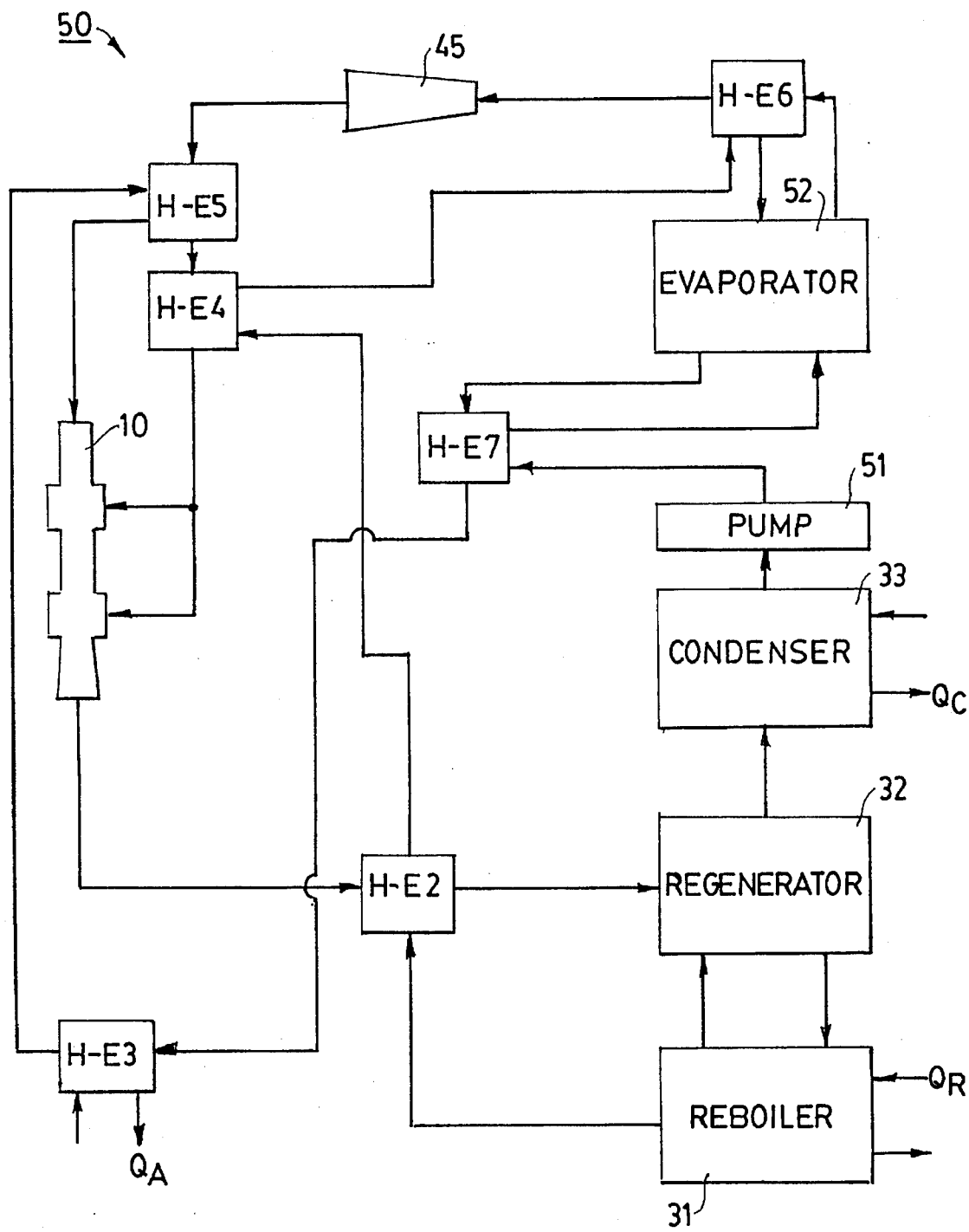
FIG. 4 is a schematic diagram of an absorption cycle system similar to the system of FIG. 2, but arranged for powering a turbine, rather than a chiller.

A more sophisticated arrangement of an absorption cycle powering a Rankine cycle engine is shown schematically in system 50 of FIG. 4. System 50 has several components in common with systems 30 and 40, including the interarrangement with hydrokinetic amplifier 10 of heat exchangers 2–5, regenerator 32, and reboiler 31. System 50 also uses condenser 33 and powers a Rankine cycle engine represented by turbine 45. It adds to this a condensate pump 51, an evaporator 52, and heat exchangers 6 and 7. These are placed in series between heat exchanger 4 and heat exchanger 3 to exploit the heat content of the working liquid delivered from reboiler 31 and heat exchanger 2. Heat exchanger 6 serves as a superheater for vapor entering turbine 45, and heat exchanger 7 heats the condensate that is pressurized by pump 51 before it enters evaporator 52.

The working vapor is preferably near its critical temperature at heat exchanger 6 so that it can acquire significant amounts of energy with little temperature rise before entering turbine 45. This allows heat exchanger 6 to transfer significant energy to the working vapor, while cooling the working liquid, so that less energy has to be discarded at heat exchanger 3.

Figure 5:
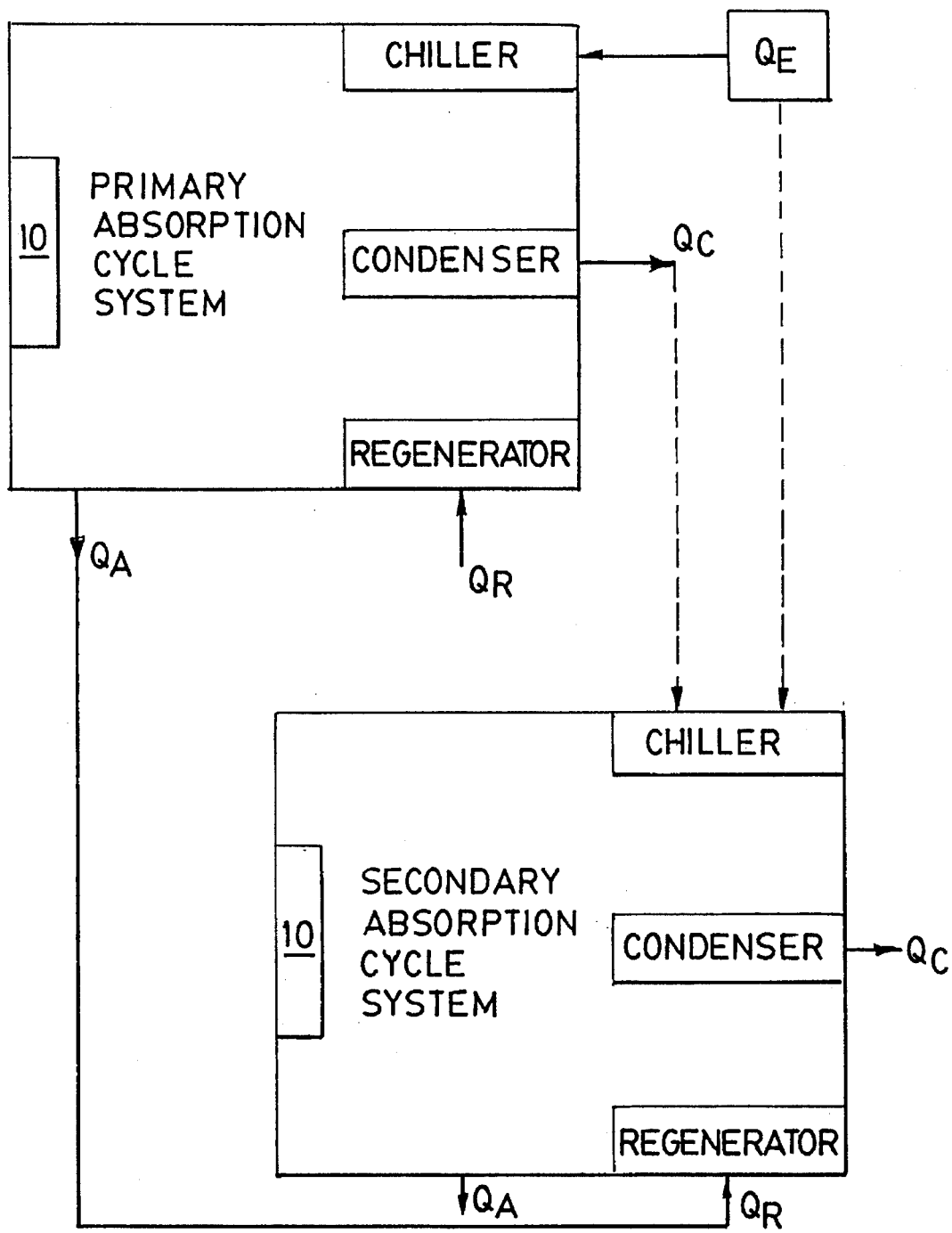
FIG. 5 is a schematic diagram of a cascaded or secondary absorption cycle system cooperating with a primary absorption cycle system, both of which employ hydrokinetic amplifiers as absorbers.

The heat discarded from a primary absorption cycle system can be used to power a secondary absorption cycle system when both systems use hydrokinetic amplifier 10 as absorbers, as schematically illustrated in FIG. 5. The heat $Q_A$ that is discarded at heat exchanger 3 of the primary absorption cycle system can be applied as heat input $Q_R$ to the regenerator of a cascaded or secondary absorption cycle system. The secondary system then provides additional chilling capacity that can augment the chilling capacity of the primary system. For example, the chiller of a secondary or cascaded system can chill the working liquid entering the hydrokinetic: amplifier of the primary system or, as shown in FIG. 5, can be used to extract the heat $Q_C$ of the primary cycle condenser or extract additional heat from the source $Q_E$ that is chilled by the primary system. Using the chiller absorbed heat for system power makes such cascaded systems feasible.

The importance of the exploitation of ambient energy absorbed at a system chiller can be understood by using such energy for starting up an absorption cycle system such as shown in FIG. 2. Assuming the system to be at ambient temperature, with the chiller having a reservoir of refrigerant and the regenerator having a reservoir of weak mixture solution, the system can be started without the addition of outside energy or motive heat by opening liquid and vapor valves (not shown) to hydrokinetic amplifier 10. When the valves open, fluid flow occurs, the system starts, the chiller begins to drop in temperature, and the hot side of the system rises in temperature. In effect, the system absorbs energy from the low temperature ambient environment of the chiller and uses that energy to produce a higher temperature.

Such a start up clearly demonstrates that energy from the chiller effectively contributes to operating the system and that chiller energy continuously heats the system. Sustaining operation only requires enough additional heat to increase the temperature at the regenerator to evaporate the refrigerant.

Part of the heat required to operate the system comes from not wasting the heat of the refrigerant vapor from the chillerr as present systems do. Using this heat of condensation to operate the system substantially improves both system efficiency and system applications.

The specific arrangements in systems 30, 40, and 50 illustrate some of the variety that is possible in absorption cycle systems using hydrokinetic amplifier 10 as an absorber. Many other variations than those illustrated are also possible; and many existing components for absorption cycle systems have been omitted from the illustrations for simplicity, but can be incorporated into working absorption cycles in practice.

I claim:

1. In an absorption cycle system using an absorbent liquid and an absorbable working fluid, the improvement comprising:
   a. a system stream of working fluid vapor directed to merge with a system stream of absorbent liquid so that the kinetic energy of the vapor accelerates the liquid stream while an absorbable portion of the vapor is absorbed in the liquid stream and an unabsorbable additional portion of the vapor is entrained in the liquid stream; and
   b. a nozzle and a diffuser receiving the combined liquid and vapor streams and converting fluid velocity to pressure applied to a liquid mixture containing substantially more of the working fluid than can be absorbed in the absorbent liquid stream.

2. The improvement of claim 1 wherein the pressure of the mixture in the diffuser is higher than the pressure of either the absorbent liquid or the working vapor upstream of the merger.

3. The improvement of claim 1 wherein the temperature of the mixture in the diffuser is higher than the temperature of either the absorbent liquid or the working vapor upstream of the merger.

4. The improvement of claim 3 wherein the pressure of the mixture in the diffuser is higher than the pressure of either the absorbent liquid or the working vapor upstream of the merger.

5. The improvement of claim 1 wherein supplemental working fluid vapor is entrained in the merged liquid and vapor streams before the mixture emerges from the diffuser.

6. The improvement of claim 1 including systematic retention of the heat of absorption as the liquid and vapor merge so that the heat of the liquid and vapor are retained by the mixture and delivered to a system circuit downstream of the diffuser.

7. The improvement of claim 6 wherein the temperature of fluid in the system circuit downstream of the diffuser is raised by transferring heat from the system circuit to preheat the working fluid vapor just before the merger with the liquid.

8. The improvement of claim 6 wherein shaft work is extracted from the working fluid vapor.

9. The improvement of claim 8 wherein the working fluid is preheated with heat from the system circuit before performing shaft work.

10. The improvement of claim 6 wherein the working fluid in the system circuit removes heat from a condenser of a Rankine cycle engine.

11. The improvement of claim 6 wherein the working fluid vapor drives a Rankine cycle engine.

12. The improvement of claim 6 wherein heat rejected by the system circuit is used to power a secondary absorption cycle system that kinetically merges streams of working fluid vapor and absorbent liquid directed through a nozzle and a diffuser.

13. The improvement of claim 6 wherein the working fluid vapor is superheated with heat from the system circuit just before merging with the liquid.

14. The improvement of claim 13 wherein the temperature and vapor pressure of the liquid stream is too high for absorption of saturated vapor.

15. The improvement of claim 6 wherein the system circuit includes a chiller where the working fluid acquires heat for chilling purposes and a regenerator where heat is added to the system circuit to regenerate the working fluid and wherein the heat acquired by the working fluid at the chiller is substantially retained and delivered to the regenerator to reduce the amount of heat added to the system circuit at the regenerator.

16. A hydrokinetic absorber and compressor arranged within an absorption circuit, the absorber and compressor comprising:
   a. an input liquid nozzle that directs a jet of an absorbent liquid through a mixing chamber into a nozzle and diffuser;
   b. an input vapor nozzle that directs a jet of working fluid vapor into the mixing chamber to contact and mix with the absorbent liquid jet and proceed with the absorbent liquid jet through the nozzle and diffuser; and
   c. the vapor nozzle providing a vapor flow rate that substantially exceeds the rate of absorption of the vapor in the liquid jet so that unabsorbed vapor mixes with and moves with the liquid jet into the diffuser where unabsorbed vapor is compressed with the liquid.

17. The absorber and compressor of claim 16 wherein the pressure of the mixture in the diffuser is higher than the pressure of either the absorbent liquid or the working fluid vapor upstream of the input nozzles.

18. The absorber and compressor of claim 16 wherein the temperature of the mixture in the diffuser is higher than the temperature of either the absorbent liquid or the working fluid vapor upstream of the input nozzles.

19. The absorber and compressor of claim 18 wherein the pressure of the mixture in the diffuser is higher than the pressure of either the absorbent liquid or the working vapor upstream of the merger.

20. The absorber and compressor of claim 16 combined with a heat exchanger transferring heat from a downstream side of the diffuser to the working fluid vapor upstream of the input vapor nozzle.

21. The absorber and compressor of claim 16 wherein heat from the absorption circuit is used for superheating the working fluid vapor upstream of the input vapor nozzle.

22. The absorber and compressor of claim 16 including a secondary vapor input arranged downstream of the mixing chamber for entraining additional working fluid vapor in the liquid and vapor mixture.

23. The absorber and compressor of claim 16 including systematic retention of the heat of the liquid and vapor during the absorbing and entraining merger.

24. A method of combining a working vapor with an absorbent liquid in an absorption cycle, the combining method comprising:
   a. merging a jet of the working vapor with a jet of the absorbent liquid so that:
      (1) a portion of the vapor jet is absorbed in the liquid jet;
      (2) another portion of the vapor jet is mixed with and entrained in the liquid jet; and
      (3) kinetic energy of the vapor jet is transferred to the liquid jet to accelerate the liquid in its direction of flow; and
   b. directing the combined liquid and vapor jets into a nozzle and diffuser to convert the kinetic energy of the fluid flow into pressure of a fluid mixture.

25. The method of claim 24 including establishing input pressures and flow rates for the liquid and vapor jets so that an output pressure of the mixture from the diffuser exceeds the input pressure of either the liquid or the vapor.

26. The method of claim 24 including establishing temperatures and flow rates for the input liquid and vapor jets so that the temperature of the output mixture from the diffuser exceeds the temperature of either the liquid or vapor inputs.

27. The method of claim 26 including establishing input pressures and flow rates for the liquid and vapor jets so that an output pressure of the mixture from the diffuser exceeds the input pressure of either the liquid or the vapor.

28. The method of claim 24 including superheating the working vapor upstream of the working vapor jet and by deriving heat from fluid downstream of the diffuser.

29. The method of claim 24 including systematically retaining the heat of absorption with the liquid and vapor directed to the nozzle and diffuser.

30. The method of claim 29 including heating the working vapor with heat derived from the condenser of a Rankine cycle engine.

31. The method of claim 29 including heating the working vapor with heat derived from exhaust gases from a combustion process.

32. The system of claim 29 including driving a shaft with the working vapor.

33. The method of claim 24 including merging a supplemental jet of the working vapor with the combined liquid and vapor upstream of the output of the diffuser.

34. The method of claim 29 including systematically retaining heat acquired by the working fluid at a chiller in the absorption cycle and delivering the retained heat with the working fluid to a regenerator in the absorption cycle to reduce the amount of heat needed to be added at the regenerator.

35. An absorber entrainer for an absorption cycle system, the absorber entrainer comprising:

a. a liquid nozzle that directs an absorbent liquid jet through a mixing chamber and into an output nozzle and diffuser;

b. a vapor nozzle that directs a working vapor jet into contact with. the liquid jet so that the vapor and liquid jets merge and mix together and flow the mixture through the output nozzle and into the diffuser; and c. the working vapor being a material that is absorbable into the absorbent liquid, and the vapor jet having a sufficient flow rate relative to the absorbent liquid flow rate so that more vapor than can be absorbed in the liquid jet is merged with the liquid jet and entrained with the liquid into the diffuser where the unabsorbed vapor is compressed and carried downstream with the liquid.

36. The absorber entrainer of claim 35 wherein the pressure of the liquid and vapor mixture downstream of the diffuser is higher than the pressures of either the liquid or vapor inputs upstream of the respective liquid and vapor nozzles.

37. The absorber entrainer of claim 35 wherein the temperature of the liquid and vapor mixture downstream of the diffuser is higher than the temperatures of either the liquid or vapor inputs upstream of the respective liquid and vapor nozzles.

38. The absorber entrainer of claim 37 wherein the pressure of the liquid and vapor mixture downstream of the diffuser is higher than the pressures of either the liquid or vapor inputs upstream of the respective liquid and vapor nozzles.

39. The absorber entrainer of claim 35 including a secondary vapor input arranged downstream of the mixing chamber for entraining additional working fluid vapor in the liquid and vapor mixture.

40. The absorber entrainer of claim 35 including systematic retention and delivery to the diffuser of the heat of absorption.

41. The absorber entrainer of claim 40 combined with a heat exchanger transferring heat from a downstream side of the diffuser to the working fluid vapor upstream of the input vapor nozzle.

42. The absorber entrainer of claim 40 wherein heat from a downstream side of the diffuser is used for superheating the working fluid vapor upstream of the input vapor nozzle.

43. In an absorption cycle system having a regenerator for a working fluid vapor, the improvement comprising:

a. an absorber formed of a hydrokinetic amplifier that merges a stream of working fluid vapor with a stream of absorbent liquid and directs the merged mixture through a nozzle and diffuser and toward the regenerator;

b. the heat of the absorption occurring in the hydrokinetic amplifier being systematically retained and directed with the mixture toward the regenerator; and c. the mixture output from the diffuser having a higher temperature and pressure than the vapor and liquid streams flowing into the hydrokinetic amplifier.

44. The improvement of claim 43 wherein heat acquired by the working fluid vapor in a chiller is systematically retained and directed with the mixture from the hydrokinetic amplifier to the regenerator to reduce the amount of heat added at the regenerator.

45. The improvement of claim 43 wherein heat from downstream of the hydrokinetic amplifier is transferred to superheat the working fluid vapor upstream of the hydrokinetic amplifier.

46. The improvement of claim 43 wherein the hydrokinetic amplifier merges a supplemental stream of the working fluid vapor with the mixture directed through the diffuser.

47. The improvement of claim 43 including a chiller where the working fluid vapor acquires heat from a condenser of a Rankine cycle engine.

48. The improvement of claim 43 wherein the working fluid vapor produces shaft work.

\* \* \* \* \*